Nov. 19, 1957  F. B. WHALEN  2,813,727
VEHICLE TRAIN ASSEMBLY
Filed Aug. 16, 1954

INVENTOR.
FRANK B. WHALEN
BY Marechal, Biebel, French & Bugg
ATTORNEYS

United States Patent Office 2,813,727
Patented Nov. 19, 1957

2,813,727

VEHICLE TRAIN ASSEMBLY

Frank B. Whalen, Dallas, Tex., assignor to Prior Products, Inc., Dallas, Tex., a corporation of Texas Application August 16, 1954, Serial No. 449,897

5 Claims. (Cl. 280—408)

This invention relates to a vehicle train assembly, and particularly to a flat bed hand truck and a trailer designed to be coupled to the truck.

Flat bed trucks of the type normally used in warehouses and factories are often designed to form part of a train of vehicles which may be towed by a tractor or by hand, or perhaps be hooked to some type of mechanical conveyor for transporting material along an assembly line. In many instances it is desirable to have the truck and trailer or trailers present a substantially continuous horizontal surface so that the material to be carried may be supported across the articulated joint between the several vehicles making up the train. On the other hand, unless sufficient play is provided in the couplings between these vehicles to allow for movement of the train over uneven surfaces, for example slopes or ramps in a factory floor or leading to loading platforms and the like, binding may result.

It is therefore an object of this invention to provide a vehiclular train assembly wherein the towing and trailing vehicles are coupled together to present an essentially continuous horizontal bed surface, and wherein also the coupling between adjacent vehicles is articulated to provide for movement of the train over surfaces which vary from horizontal.

Another object of the invention is to provide a tow arm assembly for a vehicle train wherein the tow arm may be folded or retracted at one end of the truck so as not to interfere with manual operation of the truck, and which may be placed in operative position with a minimum of effort.

Other objects and advantages of the invention will be apparent from the following description, the accompanying drawings and the appended claims.

In the drawing—

Figure 1:
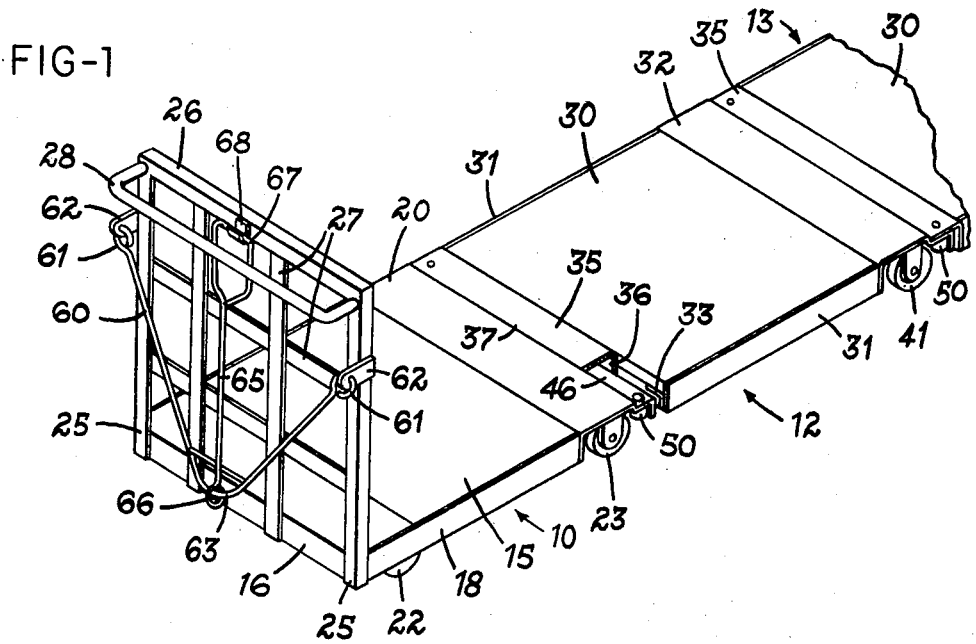
Fig. 1 is a perspective view of a vehicle train assembly in accordance with this invention.

Referring to the drawing, which illustrates a preferred embodiment of the invention, a flat bed type of truck or cart is indicated generally at 10 and is coupled to a flat bed type of trailer cart 12 to provide a train of vehicles. A portion of an additional trailer 13 is seen coupled to the rear of trailer 12, and it will be appreciated that more trailers could be added in a like manner to enlarge the train if desired. Since the coupling between trailers 12 and 13 is identical to that between truck 10 and trailer 12, the same reference numerals have been applied to both couplings.

Referring particularly to cart 10, it is seen to include a central panel 15 providing a load carrying platform or bed. The panel is surrounded by a framework for supporting and protecting it which includes a front cross member 16, side frame members 18 and a rear frame channel 20. Suitable swiveled casters 22 are mounted beneath the front of the truck in any convenient manner, and rigid truck casters 23 are attached within channel 20 by means of mounting plates 24. At the front of the truck, extending upward from the front corner thereof at opposite ends of cross member 16, are posts 25 secured at their bottoms to the front of the truck and having their upper ends connected by cross piece 26. Further vertical and horizontal bars 27 may be connected between posts 25 and cross piece 26 to strengthen the front structure or tower provided by these members, and a horizontal handle 28 is connected at its opposite ends near the top of posts 25 to provide a grip for manual movement of the truck.

Trailer 12 includes a bed panel 30 similarly surrounded and supported by a frame including side rails 31 and a rear frame channel 32, which may be constructed identically to truck rear channel 20, thus providing for the connection of additional trailers 13 into the train. Angle bars 33 are secured to the insides of side frame members 31 and extend the length thereof to provide support for panel 15. An angle bar 35 extends across the front of the trailers and has one leg 36 thereof connected to the front edge of the trailer so that its other leg 37 extends in the same horizontal plane as panel 30 and frame members 31 and 32 to provide a forwardly protruding lip portion for coupling to the truck 10. A number of coupling pins 40 depend from the leg 37 of bar 35 to provide coupling members for joining the trailer and truck, and swiveled casters 41 are provided for the trailer within the rear frame channel 32, the front of the trailer body being supported solely by the coupling.

Figure 2:
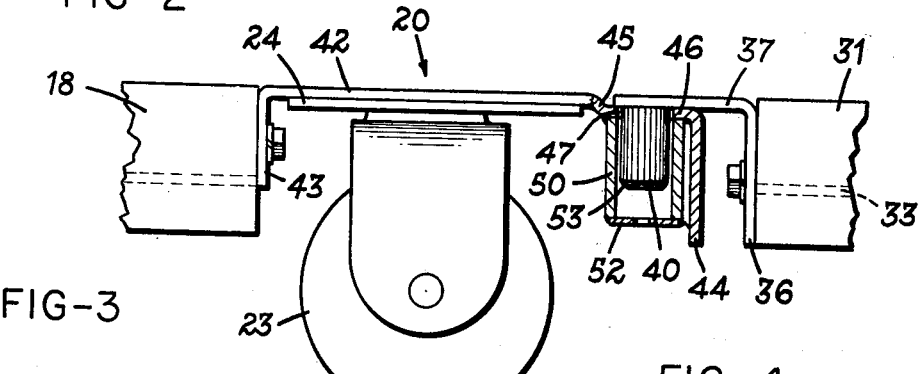
Fig. 2 is a detail view, partly in section and partly in elevation, of the coupling seen in Fig. 1.

Referring particularly to Fig. 2, the rear truck channel 20 includes a center portion 42 and downwardly extending legs 43 and 44. The leg 43 is adapted to abut and engage panel 15, and the other leg 44 forms the rear edge and bumper of truck 10. The rear edge of frame channel 20 is offset downwardly and outwardly at 45 below the bottom portion 42 to provide a recessed hitch portion or plate 46 which extends across the entire rear of the truck, this recessed portion being of such a depth relative to the bottom 42 as to provide a horizontal recess across the channel 20 which is substantially equal in depth to the thickness of trailer lip 37. When the vehicles are joined, the lip portion is thus received upon plate portion 46 and presents a substantially continuous horizontal surface which includes the panels 15 and 30, the lip portion 37, and the bottom surfaces of channels 20 and 32.

In order to couple the vehicles together, a number of apertures 47 are formed vertically through the recessed plate portion 46, spaced apart to coincide with the spacing of pins 40 and to receive these pins therethrough for hitching the vehicles together. A section of tubing 50 is welded or similarly affixed to the bottom of portion 46 beneath each aperture 47, so as to provide a socket at each of these apertures, and a disk or washer 52 is welded to the bottom of each tube 50 to substantially close the sockets thus formed, and thus to provide a support for posts or poles (not illustrated) which may be inserted in the sockets when the truck is to be used alone.

To make up the vehicle train, the truck and at least one trailer are placed in horizontal alignment, with lip portion 37 of the trailer extending over the hitching plate portion 46 of the truck, and the pins 40 are allowed to drop into apertures 47 and tubes 50. Each of the pins 40 is rounded at its lower edge 53 to facilitate the insertion of the pins into the sockets, and also to provide a certain amount of play in the coupling. In actual practice the pin 40 is made from one inch round bar and the socket tube 50 has an internal diameter of 1¼ inches, thus providing a clearance of 1/8 inch between the adjacent surfaces of the pin and tube. If the train is drawn over uneven surfaces, for example up and down ramps, this clearance permits the pin to cant somewhat within the socket and prevents binding of the coupling by providing for a corresponding degree of articulation between the lip portion and the hitching plate.

Figure 4:
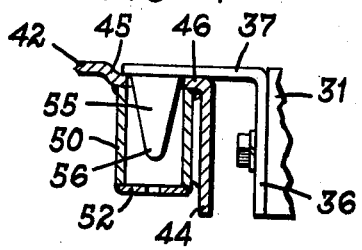
Fig. 4 is a detail view of a modified coupling similar to that shown in Fig. 2.

Referring to Fig. 4, there is shown a somewhat modified type of coupling pin 55 which is tapered toward its end 56 to provide a greater clearance between the pin and the inner walls of tubing 50. This tapered pin permits a greater angle of articulation for the coupling, such as may be desired where the train is to be used on unusually uneven surfaces, or to be continually moved up and down ramps or relatively steep slopes. A suitable degree of taper has been obtained by using round bar one inch in diameter and 1½ inches long, tapered to a ½ inch diameter at lower end 56.

In some instances it may be desirable to tow the train of vehicles by a power operated truck, or to attach the truck 10 to a moving conveyor for pulling the train along an assembly line. A towing assembly is provided on truck 10 for this purpose, including a generally V-shaped draw bar 60 which is hinged at its free ends 61 to a pair of plate-shaped brackets 62 fixed to posts 25. These plates are located somewhat below the top of the posts, the distance below the top being determined by the length of the draw bar so that the apex 63 of the bar rests adjacent the front cross member 16 of the truck when the draw bar is in its folded or retracted position as illustrated.

A tow bar 65 is hinged at one end 66 to the apex 63 of the draw bar, and has a handle loop 67 formed at its other end for attachment to any appropriate towing mechanism. The length of tow bar 65 is such that when the draw bar is folded against the front of the truck, the handle loop 67 may be placed adjacent the cross piece 26, and a hook 68 is fastened substantially at the center of the cross piece to engage the handle loop 67 and support the entire towing assembly, in cooperation with brackets 62 in folded position at the front of the truck.

Figure 3:
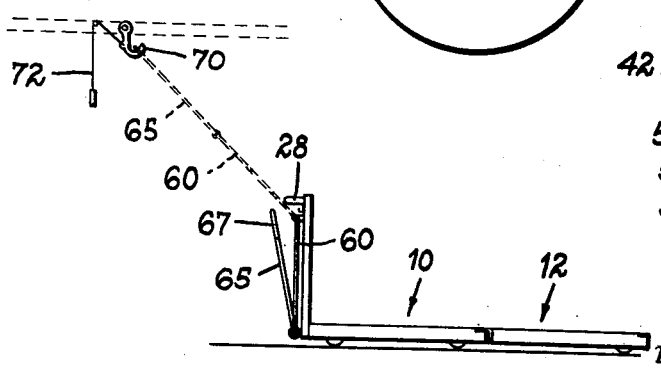
Fig. 3 is a schematic illustration of the vehicle train assembly indicating how the towing arm may be attached to an overhead conveyor.

Fig. 3 illustrates schematically the use of the towing assembly in attaching the truck to an overhead conveyor having a hook 70 provided with a release line 72. The handle loop 67 is released from hook 68 and swung forwardly of the truck, passing beneath handle 28 to the position shown in solid lines in Fig. 3. Draw bar 60 may then be pulled upwardly about brackets 62 as pivots and the entire towing assembly unfolded into the extended aligned position seen in dotted lines in Fig. 3, with the loop 67 engaged by hook 70. It will be appreciated that the towing assembly may be unfolded in a similar manner and coupled to a motorized truck to provide for towing the train if so desired.

The present invention provides a simple and inexpensive coupling for such train assemblies which is rigid, free from complex coupling members and therefore easily maintained, and yet extremely rugged in construction. The trailer and truck, hitched together, present a continuous horizontal surface which may be extended along the length of the train by adding identical trailers as desired, yet the couplings between the truck and trailer and between such additional trailers are articulated to pass over uneven horizontal surfaces with a minimum of resistance or binding. The towing assembly is conveniently folded out of the way at the front of the truck, yet may be quickly and easily moved to an operative position when it is desired to tow the train assembly by some mechanical means.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In a vehicle train, the combination of a truck having a flat bed, a trailer having a flat bed at the same elevation as said truck bed, a connecting lip portion extending horizontally from the front of said trailer to provide a frontal continuation of the trailer bed surface, a plurality of pins depending from said lip portion at spaced intervals therealong, a hitching plate projecting horizontally from the rear edge of said truck bed along a plane spaced vertically below said truck bed by a distance substantially equal to the thickness of said lip portion to form a recess across the rear of said truck, and a plurality of apertures formed vertically through said plate at intervals spaced to coincide with the spacing of said pins for receiving said pins therein and providing for reception of said lip portion in said recess to align said truck and trailer beds and said lip portion in a single horizontal plane.

2. A vertically releasable hitch for connecting a pair of flat bed vehicles, comprising a connecting lip portion extending horizontally from the front edge of one of said vehicles to provide a frontal continuation of the bed surface thereon, a plurality of pins depending from said lip portion at spaced intervals therealong, a hitching plate projecting horizontally from the rear edge of the bed surface on the other said vehicle along a plane spaced vertically below said bed by a distance substantially equal to the thickness of said lip portion to form a recess across the rear of said other vehicle, and a plurality of sockets formed vertically through said plate at intervals spaced to coincide with the spacing of said pins for receiving said pins therein and providing for reception of said lip portion in said recess to align said beds and said lip portion horizontally, said sockets including tubular extensions depending below said plate and having the bottoms thereof substantially closed to provide for receiving posts in said sockets when said vehicles are unhitched from each other.

3. In a vehicle train the combination of a trailing vehicle including a substantially rectangular frame enclosing and supporting a floor panel, said frame including an angle bar having one leg thereof secured to the front end of said trailing vehicle and having the other leg thereof projecting forwardly of said vehicle in horizontal alignment with said floor panel, a plurality of pins depending from said other leg at spaced intervals along said angle bar, another flat bed vehicle including a substantially rectangular frame surrounding and supporting a floor panel, said frame including an inverted generally U-shaped rear channel forming a hitching plate member for attachment of said trailing vehicle to said other vehicle, said channel having its bottom portion in substantial horizontal alignment with said floor panel of said other vehicle and having its legs depending from said bottom portion across the rear of said other vehicle, said bottom portion of said plate being formed to provide a horizontal recess of a depth sufficient to receive said other leg of said angle bar across the entire rear of said other vehicle, said recess portion having a plurality of apertures formed vertically therethrough at spaced intervals coinciding with the spacing of said pins to receive said pins and hitch said trailing vehicle to said other vehicle with said floor panels and said other leg of said angle bar and the bottom of said channel all extending in the same horizontal plane, and a plurality of tubes secured to the underside of said recessed portion in alignment with said apertures to provide sockets for supporting posts at the rear edge of said other vehicle when said trailing vehicle is detached therefrom.

4. In a vehicle having a flat load carrying bed, the combination of framework surrounding and supporting said bed including an angle bar extending across the front end of said vehicle and having one leg thereof projecting forwardly of the vehicle in horizontal alignment with said bed, the other leg of said bar extending downwardly from said one leg in abutting relationship with the front edge of said bed, a plurality of coupling pins depending from said one leg, an inverted generally U-shaped channel extending across the rear edge of said bed and having its bottom portion substantially in horizontal alignment with said bed, said bottom portion having a horizontal recess formed therein of a depth substantially equal to the thickness of said one leg and opening rearwardly of the trailer to provide a hitching portion for receiving the forwardly extending leg of another similar vehicle for coupling thereto, said recess portion having a plurality of apertures formed vertically therethrough to receive the coupling pins of the other vehicle, and a socket below each of said apertures having an internal cross-section slightly greater than and complementary to the cross-section of said coupling pins to provide for articulation of the coupling between the vehicles.

5. A vehicle train assembly, comprising a truck having a flat bed, a trailer having a flat bed at the same elevation as said truck bed, a connecting lip portion extending horizontally from the front of said trailer to provide a frontal continuation of the trailer bed surface, a plurality of pins depending from said lip portion at spaced intervals therealong, a hitching plate projecting horizontally from the rear edge of said truck bed along a plane spaced vertically below said truck bed by a distance substantially equal to the thickness of the said lip portion to form a recess across the rear of said truck, draw-bar means connected to the front of said truck for attaching the train assembly to a towing device, and a plurality of apertures formed vertically through said plate at intervals spaced to coincide with the spacing of said pins for receiving said pins therein and providing for reception of said lip portion in said recess to align said truck and trailer beds and said lip portion in a single horizontal plane and to transmit the pulling force from said draw-bar means to said trailer.

References Cited in the file of this patent

UNITED STATES PATENTS

| | | |
|---|---|---|
| 526,395 | Johns | Sept. 25, 1894 |
| 1,339,109 | Irrgang | May 4, 1920 |
| 1,501,280 | Hinshaw | July 15, 1924 |
| 1,880,123 | Davis et al. | Sept. 27, 1932 |
| 2,371,811 | Ericsson | Mar. 20, 1945 |
| 2,405,161 | Nicodemus | Aug. 6, 1946 |
| 2,596,629 | Ward | May 13, 1952 |